United States Patent
Liu et al.

(10) Patent No.: US 11,901,838 B2
(45) Date of Patent: Feb. 13, 2024

(54) INVERTER MODULE FOR VEHICLE

(71) Applicant: GM GLOBAL TECHNOLOGY OPERATIONS LLC, Detroit, MI (US)

(72) Inventors: Ming Liu, Shanghai (CN); Muhammad Hussain Alvi, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 126 days.

(21) Appl. No.: 17/706,726

(22) Filed: Mar. 29, 2022

(65) Prior Publication Data

US 2023/0291321 A1 Sep. 14, 2023

(30) Foreign Application Priority Data

Mar. 11, 2022 (CN) .......................... 202210237554.8

(51) Int. Cl.
*H02M 7/00* (2006.01)
*H02M 7/5388* (2007.01)
*H02M 7/5387* (2007.01)

(52) U.S. Cl.
CPC ......... *H02M 7/003* (2013.01); *H02M 7/5388* (2013.01); *H02M 7/53875* (2013.01)

(58) Field of Classification Search
CPC . H02M 7/003; H02M 7/53875; H02M 7/5388
See application file for complete search history.

(56) References Cited

U.S. PATENT DOCUMENTS

| 7,292,451 | B2 * | 11/2007 | Rodriguez | ............ H02M 7/003 361/775 |
| 10,236,791 | B1 * | 3/2019 | Chung | ................... H02K 11/25 |
| 2014/0369099 | A1 * | 12/2014 | Asako | ................ H05K 7/20927 363/97 |
| 2017/0077272 | A1 * | 3/2017 | Kubo | ................... H02M 7/5387 |
| 2019/0317137 | A1 * | 10/2019 | Saitoh | ....................... H03F 3/45 |

OTHER PUBLICATIONS

U.S. Appl. No. 17/078,690, filed Oct. 23, 2020, Coppola et al.
U.S. Appl. No. 17/149,152, filed Jan. 14, 2021, Liu et al.

* cited by examiner

*Primary Examiner* — Jue Zhang

(57) ABSTRACT

A power module includes: a first substrate layer that is disposed on a first plane; a second substrate layer that is disposed on a second plane that is parallel to the first plane; first and second electrical conductors that are configured to be electrically connected to first and second direct current (DC) reference potentials, respectively, and that extend outwardly from the power module on a third plane that is parallel to the first and second planes; third, fourth, and fifth electrical conductors that are configured to be electrically connected to first, second, and third alternating current (AC) reference potentials, respectively, and that extend outwardly from the power module on a fourth plane that is parallel to the first, second, and third planes; and a plurality of dies of switches, respectively, disposed between the first and second substrate layers.

20 Claims, 12 Drawing Sheets

INVERTER MODULE FOR VEHICLE

CROSS-REFERENCE TO RELATED APPLICATIONS

This application claims the benefit of Chinese Patent Application No. 202210237554.8, filed on Mar. 11, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to motor control systems and methods of vehicles and more particularly to inverter modules for motors of vehicles.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a power module includes: a first substrate layer that is disposed on a first plane; a second substrate layer that is disposed on a second plane that is parallel to the first plane; first and second electrical conductors that are configured to be electrically connected to first and second direct current (DC) reference potentials, respectively, and that extend outwardly from the power module on a third plane that is parallel to the first and second planes; third, fourth, and fifth electrical conductors that are configured to be electrically connected to first, second, and third alternating current (AC) reference potentials, respectively, and that extend outwardly from the power module on a fourth plane that is parallel to the first, second, and third planes; and a plurality of dies of switches, respectively, disposed between the first and second substrate layers.

In further features, all source and gate terminals of the switches are disposed on the first plane and all drain terminals of the switches are disposed on the second plane.

In further features, capacitors are disposed between the first and second substrate layers and are electrically connected between the first and second electrical conductors.

In further features, the switches include silicon carbide switches.

In further features, the switches are connected in a bridge topography.

In further features, the switches include bi-directional switches.

In further features, the first substrate layer includes: a first copper layer; a second copper layer; and a first ceramic layer that is sandwiched between the first and second copper layers.

In further features, the second substrate layer includes: a third copper layer; a fourth copper layer; and a second ceramic layer that is sandwiched between the third and fourth copper layers.

In further features, the first ceramic layer includes silicon nitride.

In further features, electrically conductive die attachment material is disposed between source terminals of the switches and the first substrate layer, electrically conductive die attachment material is disposed between gate terminals of the switches and the first substrate layer, and electrically conductive die attachment material is disposed between drain terminals of the switches and the second substrate layer.

In further features, the electrically conductive die attachment material includes silver.

In a feature, a motor system includes: the power module; a battery; and an electric motor, where the first and second electrical conductors are configured to be electrically connected to the battery, and where the third, fourth, and fifth electrical conductors are configured to be electrically connected to first, second, and third connections of the electric motor.

In a feature, a vehicle includes: the motor system, where the electric motor is configured to propel the vehicle.

In further features, portions of the first and second electrical conductors are disposed between the first and second substrate layers.

In further features, portions of third, fourth, and fifth electrical conductors are disposed between the first and second substrate layers.

In further features: the first and second electrical conductors extend outwardly from a first lateral side of the power module; and the third, fourth, and fifth electrical conductors extend outwardly from a second lateral side of the power module, the second lateral side being opposite the first lateral side.

In further features, pins extend outwardly from the power module and that are electrically connected to gate, source, and drain terminals of the switches.

In further features, electrically conductive traces are between the first and second substrate layers that electrically connect the pins with the gate, source, and drain terminals of the switches.

In further features, spacers are disposed between the first and second substrate layers.

In a feature, a power module includes: a first substrate layer that is disposed on a first plane; a second substrate layer that is disposed on a second plane that is parallel to the first plane; first and second electrical conductors that are configured to be electrically connected to first and second direct current (DC) reference potentials, respectively, and that extend outwardly from the power module on a third plane that is parallel to the first and second planes; third, fourth, and fifth electrical conductors that are configured to be electrically connected to first, second, and third alternating current (AC) reference potentials, respectively, and that extend outwardly from the power module on a fourth plane that is parallel to the first, second, and third planes; and capacitors that are disposed between the first and second substrate layers and are electrically connected between the first and second electrical conductors.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A power module of a vehicle includes switches that regulate current flow (a) from a battery to an electric motor and (b) from the electric motor to the battery. A direct current (DC) bus capacitor may be connected between the power module and the battery. Pulse width modulated (PWM) signals may be used to control switching of the legs.

The present application involves a power module (e.g., an inverter module or including bidirectional switches) that includes switches disposed between direct bonded copper (DBC) layers (e.g., Cu/Al$_2$O$_3$/Cu). While DBC layers will be discussed herein, the present application is also applicable to switches disposed between two substrates, such as DBA(Al/Al$_2$O$_3$/Al), AMB(Cu/Si3N4/Cu), etc.

Conductors through which power flows to and from the power module are planar and parallel to the DBC layers. Gate and source connections of all of the switches are at the side of one DBC layer, and the drain connections of all of the switches are at the side of the other one of the DBC layers. The power module may also include the DC bus capacitor(s). Via the DBC layers, the power module thus has dual sided cooling, which decreases thermal resistance of the power module. The power module including the DC bus capacitor(s) decreases commutation loop inductance of the power module and commutation loop resistance of the power module.

Figure 1:
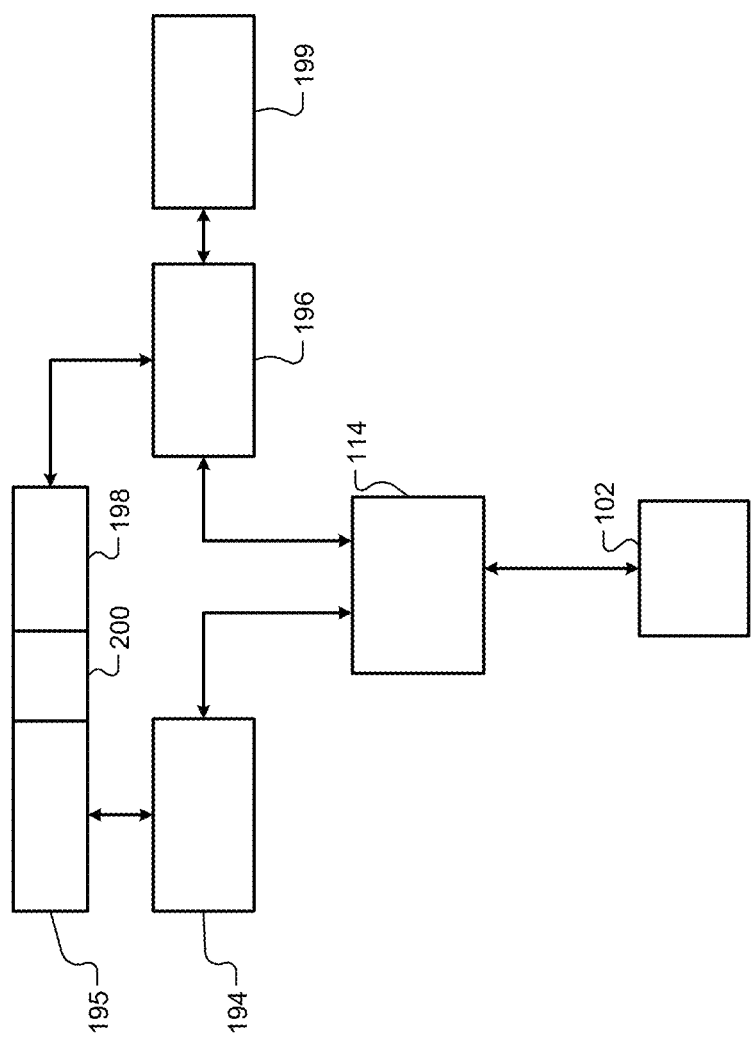
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine (including pure electric vehicles), fuel cell vehicles, autonomous vehicles, semi-autonomous vehicles, non-autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more batteries and/or battery packs.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery 199. The motor control module 196 may charge the battery 199 via the power output by the electric motor 198.

Figure 2:
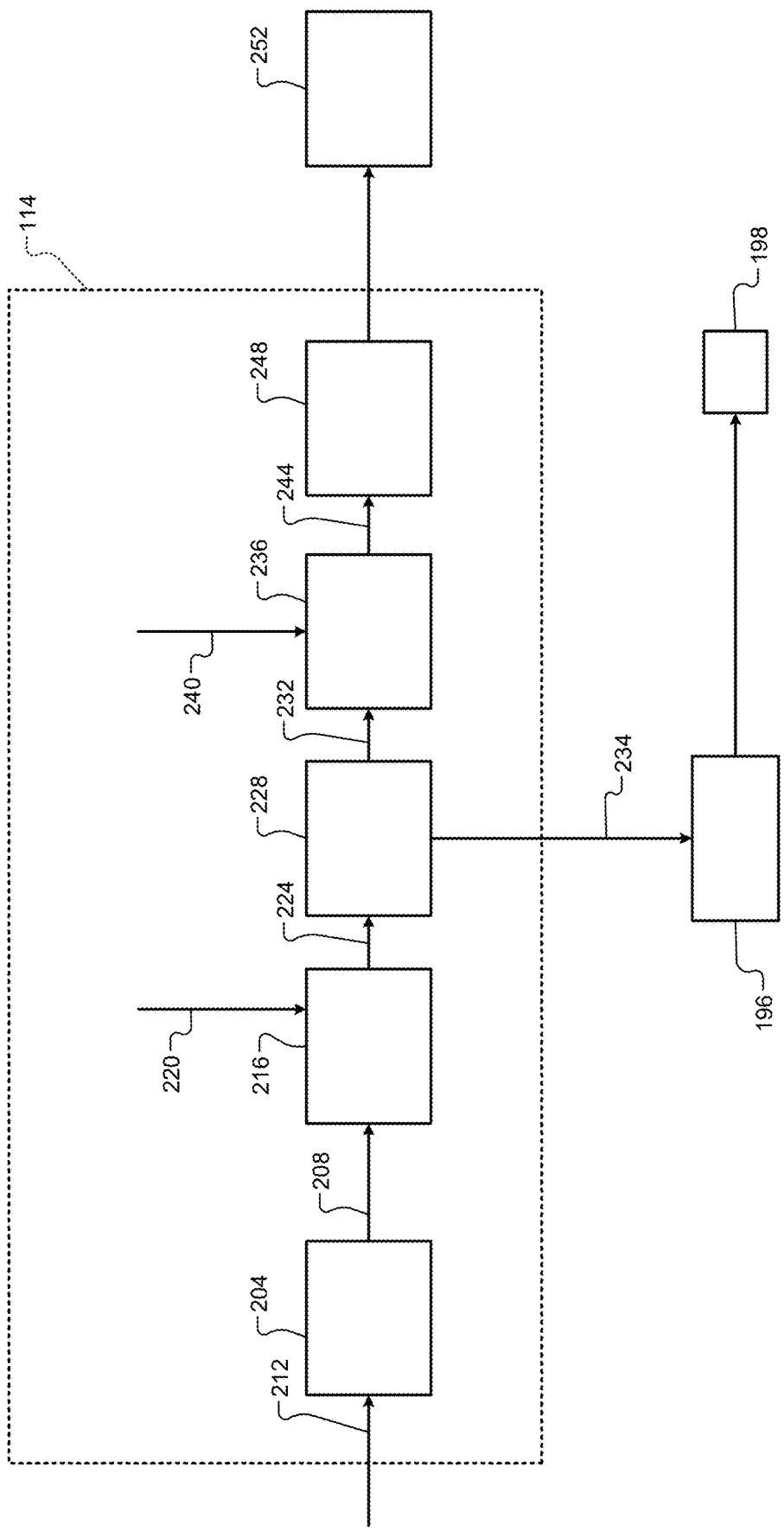
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 may determine the driver torque request 208 using one or more lookup tables or equations that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request.

In the example of an electric vehicle, the ECM 114 may be omitted, and the driver torque module 204 and the axle torque arbitration module 216 may be implemented within the motor control module 196. In electric vehicles, the driver torque module 204 may input the driver torque request 208 to the motor control module 196, and the components related to controlling engine actuators may be omitted.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of switches of an inverter module based on the motor torque request 234, as discussed further below. The inverter module converts direct current (DC) power into alternating current (AC) power. The inverter module applies AC power to the motor 198. Switching of the inverter module controls torque of the electric motor 198. The inverter module also converts power generated by the electric motor 198 into DC power and outputs DC power for the battery 199, for example, to charge the battery 199.

The inverter module includes a plurality of switches, such as three legs of switches. The motor control module switches the switches to apply alternating current (AC) power to the electric motor 198 to drive the electric motor 198. For example, the inverter module may generate n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198. The output shaft of the electric motor 198 is connected to one or more wheels of the vehicle. Examples of inverter modules are provided in FIGS. 4A and 4B.

In various implementations, the inverter module may include one or more filters (e.g. capacitors). The one or more filters may be implemented, for example, to filter power flow to and from the battery 199.

Figure 3:
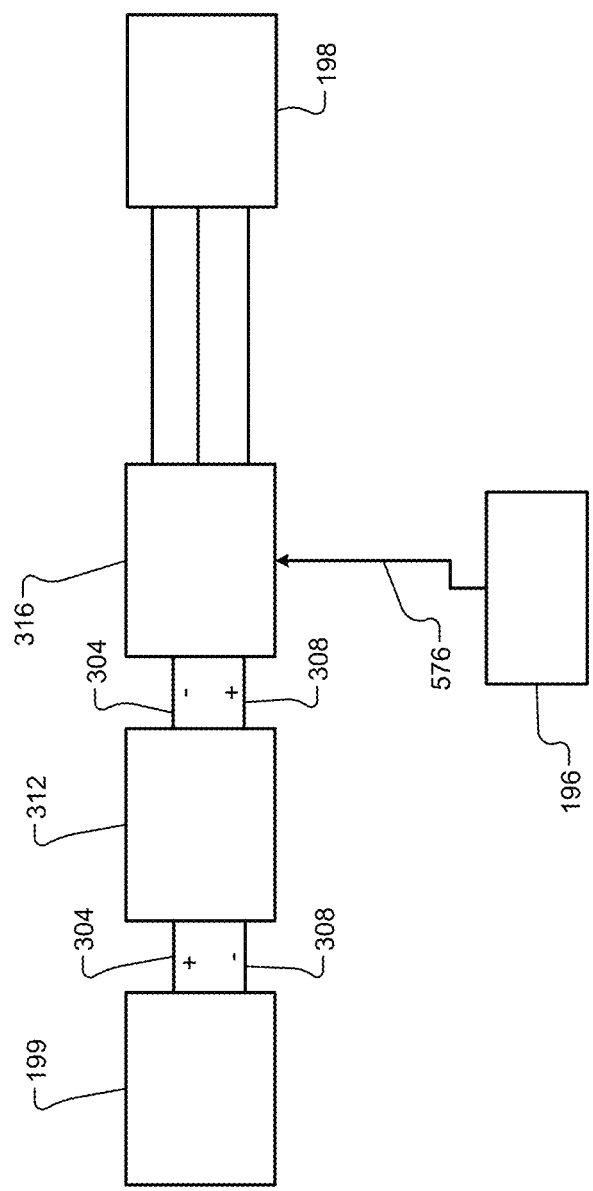
FIG. 3 includes a schematic including an example implementation of a power control system.

FIG. 3 includes a schematic including an example implementation of a power control system. The battery 199 may also be referred to or include a battery pack, as discussed above. As discussed herein, the capacitor may be included in the inverter in various implementations.

High (positive, DC+) and low (negative, DC−) sides 304 and 308 are connected to positive and negative terminals, respectively, of the battery 199. One or more capacitors, such as capacitor 312, are connected in parallel with the battery 199 between the high and low sides 304 and 308. The capacitor(s) stabilize the DC bus and provide a low impedance voltage source to the inverter module since the battery 199 may have a higher impedance. As discussed further below, the capacitor(s) 312 may be implemented within an inverter module 316. The inverter module 316 is a type of power module.

The inverter module 316 includes three legs, one leg connected to each phase of the electric motor 198. The inverter module 316 controls current flow to the legs/phases of the electric motor 198. The inverter module 316 converts DC power from the high and low sides 304 and 308 into 3-phase AC power and outputs the AC power to the electric motor 198.

Figure 4A:
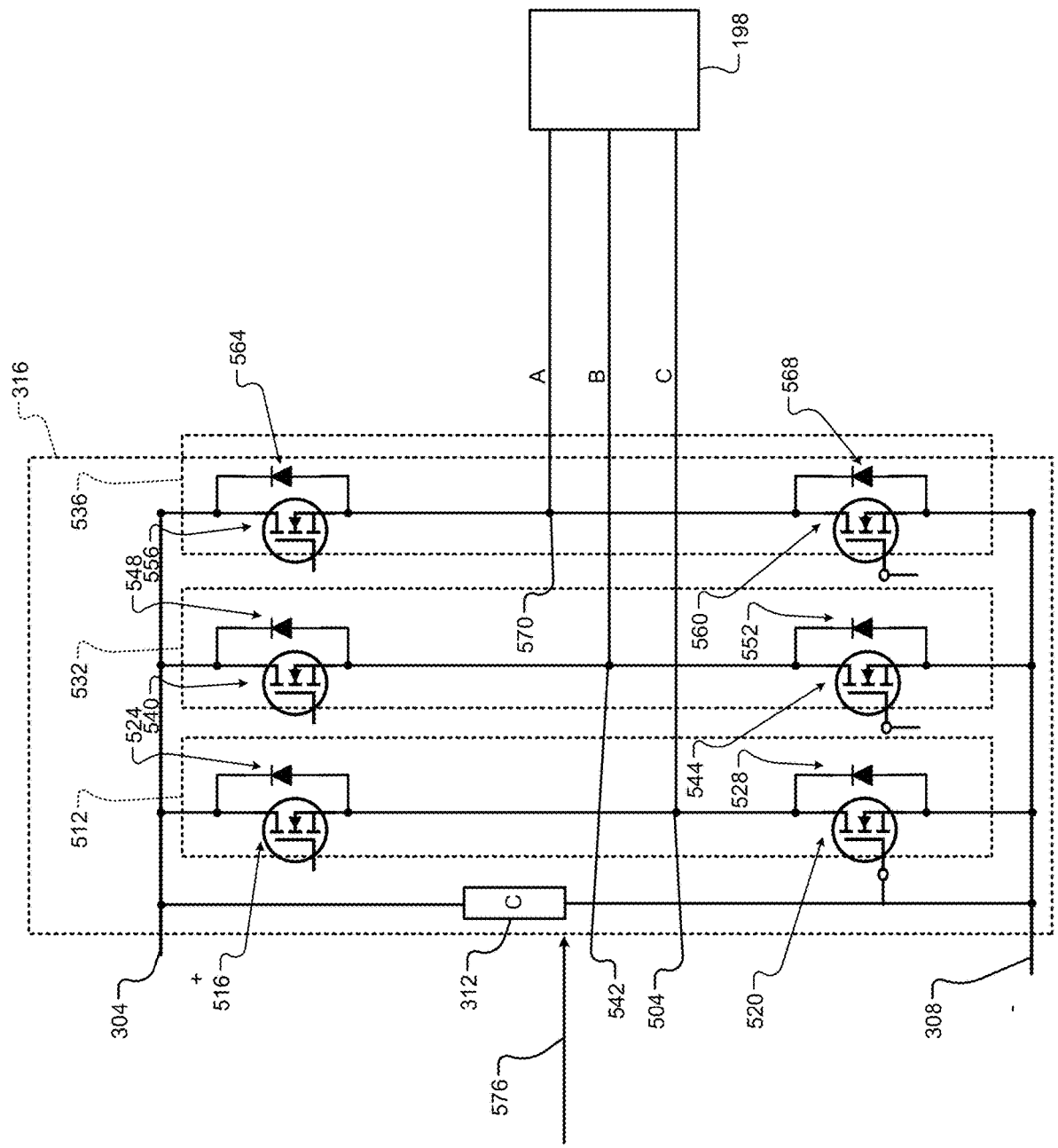
FIGS. 4A and 4B include schematics of example implementations of power modules.

FIG. 4A includes a schematic of an example implementation of the inverter module 316. The inverter module 316 includes three legs. One leg is connected to each phase of the electric motor 198.

A first leg 512 includes first and second switches 516 and 520. The switches 516 and 520 each include a first terminal, a second terminal, and a control terminal. Each of the switches 516 and 520 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 516 is connected to the high side 304. The second terminal of the first switch 516 is connected to a node 504. The second terminal of the second switch 520 may be connected to the low side 308. The node 504 is connected to the second terminal of the first switch 516, the first terminal of the second switch 520, and a first phase (e.g., a) of the electric motor 198.

The first leg 512 may include first and second diodes 524 and 528 connected anti-parallel to the switches 516 and 520, respectively. In other words, an anode of the first diode 524 may be connected to the second terminal of the first switch 516, and a cathode of the first diode 524 may be connected to the first terminal of the first switch 516. An anode of the second diode 528 may be connected to the second terminal of the second switch 520, and a cathode of the second diode 528 may be connected to the first terminal of the second switch 520. The diodes 524 and 528 form one phase of a three-phase rectifier for converting power from the electric motor 198 into power for the battery 199. However, the diodes 524 and 528 may be omitted, such as if switches 516, 540, 556, 520, 544, and 560 are MOSFETS (with a built in diode). The diodes 524 and 528 may be included if included with a power module of an IGBT.

The inverter module 316 also includes second and third legs 532 and 536. The second and third legs 532 and 536 may be (circuitry wise) similar or identical to the first leg 512. In other words, the second and third legs 532 and 536 may each include respective switches and diodes like the switches 516 and 520 and the diodes 524 and 528, connected in the same manner as the first leg 512. For example, the second leg 532 includes switches 540 and 544 and anti-parallel diodes 548 and 552. A node 542 is connected to the first terminal of the switch 544, and a second stator winding (e.g., b) of the electric motor 198. The third leg 536 includes switches 556 and 560, and anti-parallel diodes 564 and 568. A node 570 is connected to the first terminal of the switch 560 and a third stator winding (e.g., c) of the electric motor 198. Like the diodes 524 and 528, the diodes 548, 552, 564, and 568 may be omitted.

Control terminals of the switches of the inverter module 316 are connected to switch signals 576 from the motor control module 196. The motor control module 196 generates the switch signals 576 such that the high side switch of a leg is on while the low side switch of that leg is off and vice versa. The motor control module 196 generates the switch signals 576 using pulse width modulation (PWM) control.

The switch signals of the gates of the low side switches 520, 544, and 560 may be inverted such that the switch signals applied to the low side switches 520, 544, and 560 are opposite in polarity to the control signals applied to the gates of the high side switches 516, 540, and 556.

Figure 4B:
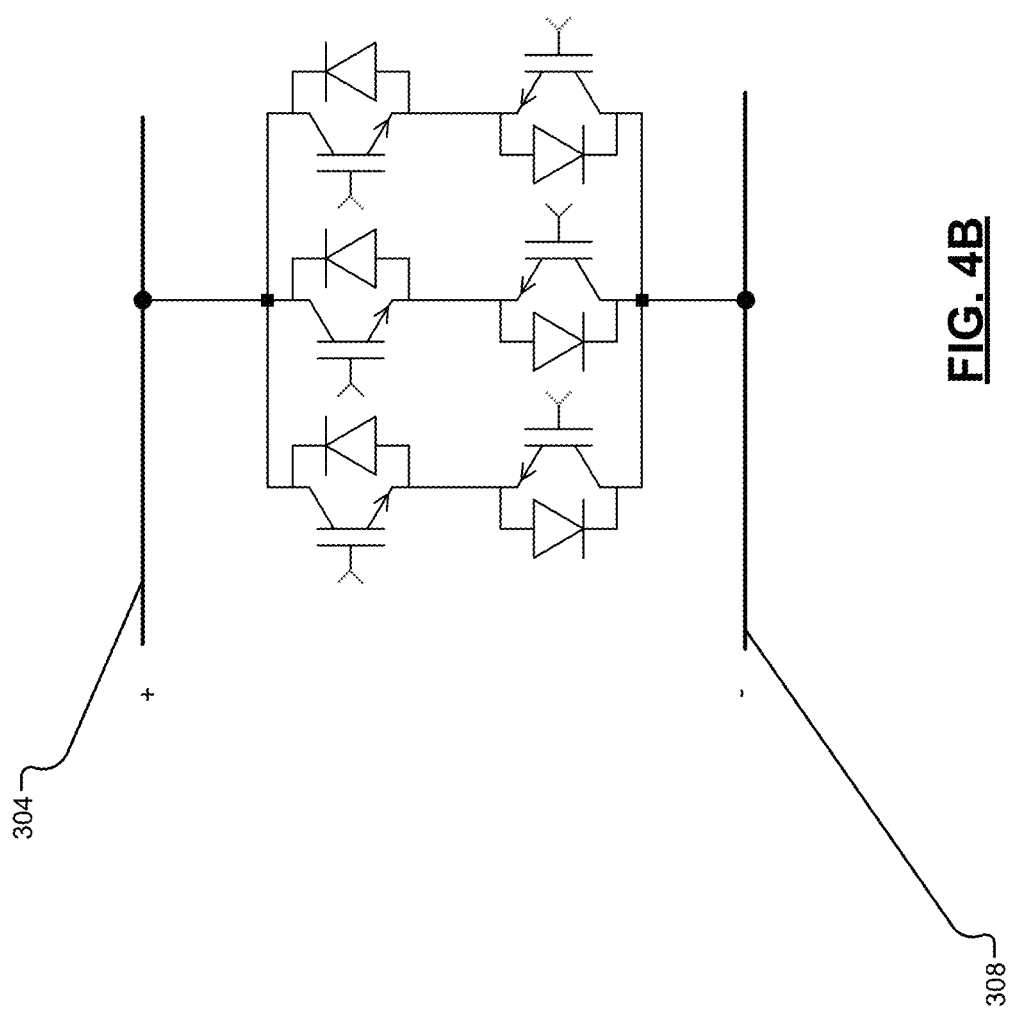

FIG. 4B is an example schematic of a power module including three legs of solid state bidirectional switches. The legs are connected in parallel or may be independent. While the example of three legs of switches is provided, the bidirectional switch may include a greater or fewer number of legs. Three legs of switches may be provided, for example, such that approximately one third of current to and from the battery flows through each leg. Generally speaking, the solid state bidirectional switch may include N legs of switches where N is an integer greater than or equal to 1. Current flow through each of the legs may be approximately equal to 1/N. Each switch and antiparallel diode may be implemented in one or more parallel die. The dies are implemented as discussed further below. Each leg includes two switches (e.g., one p-type and one n-type) and antiparallel diodes connected as shown.

Figure 5:
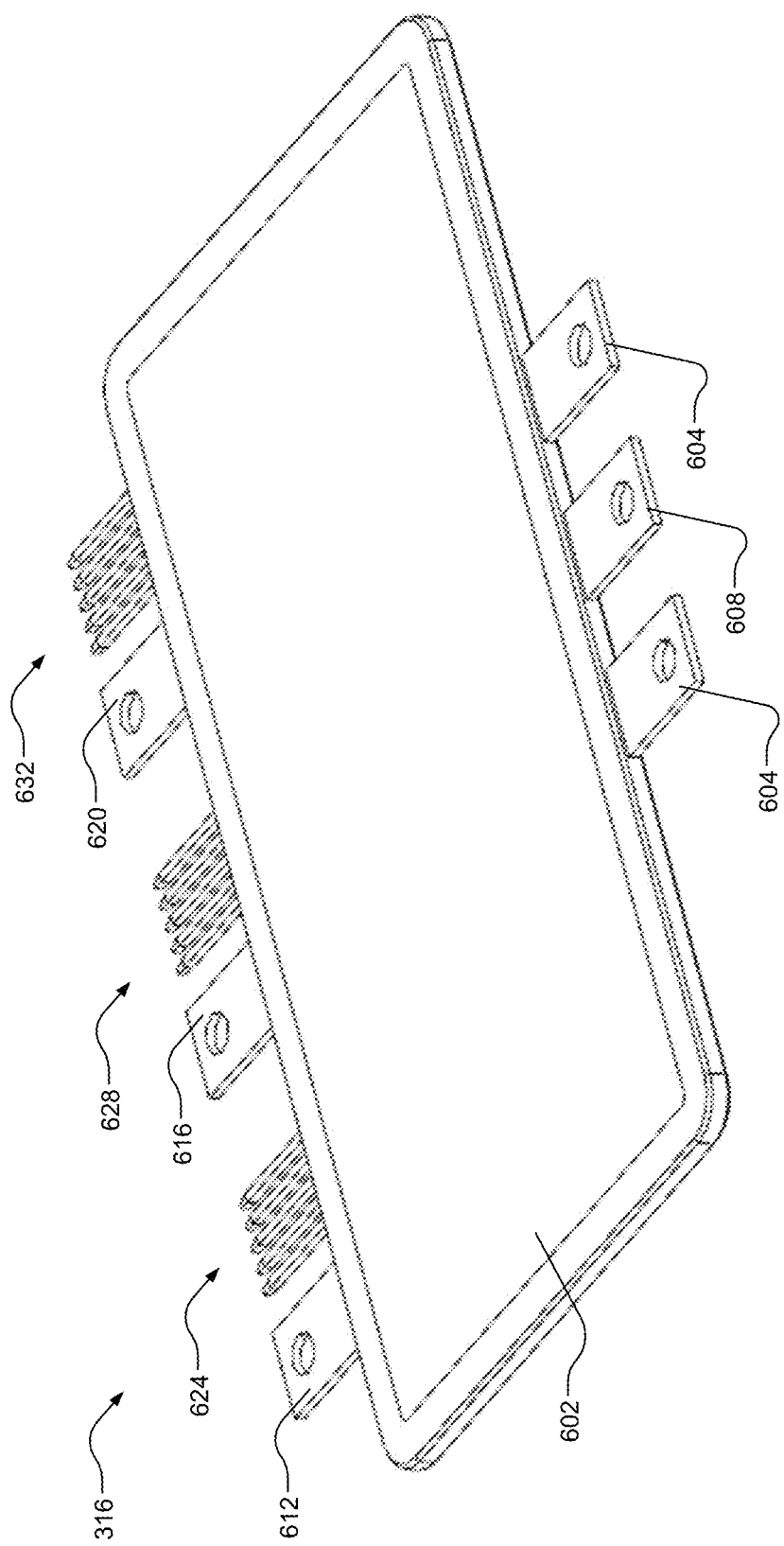
FIGS. 5 and 6 are perspective views of an example power module.
Figure 6:
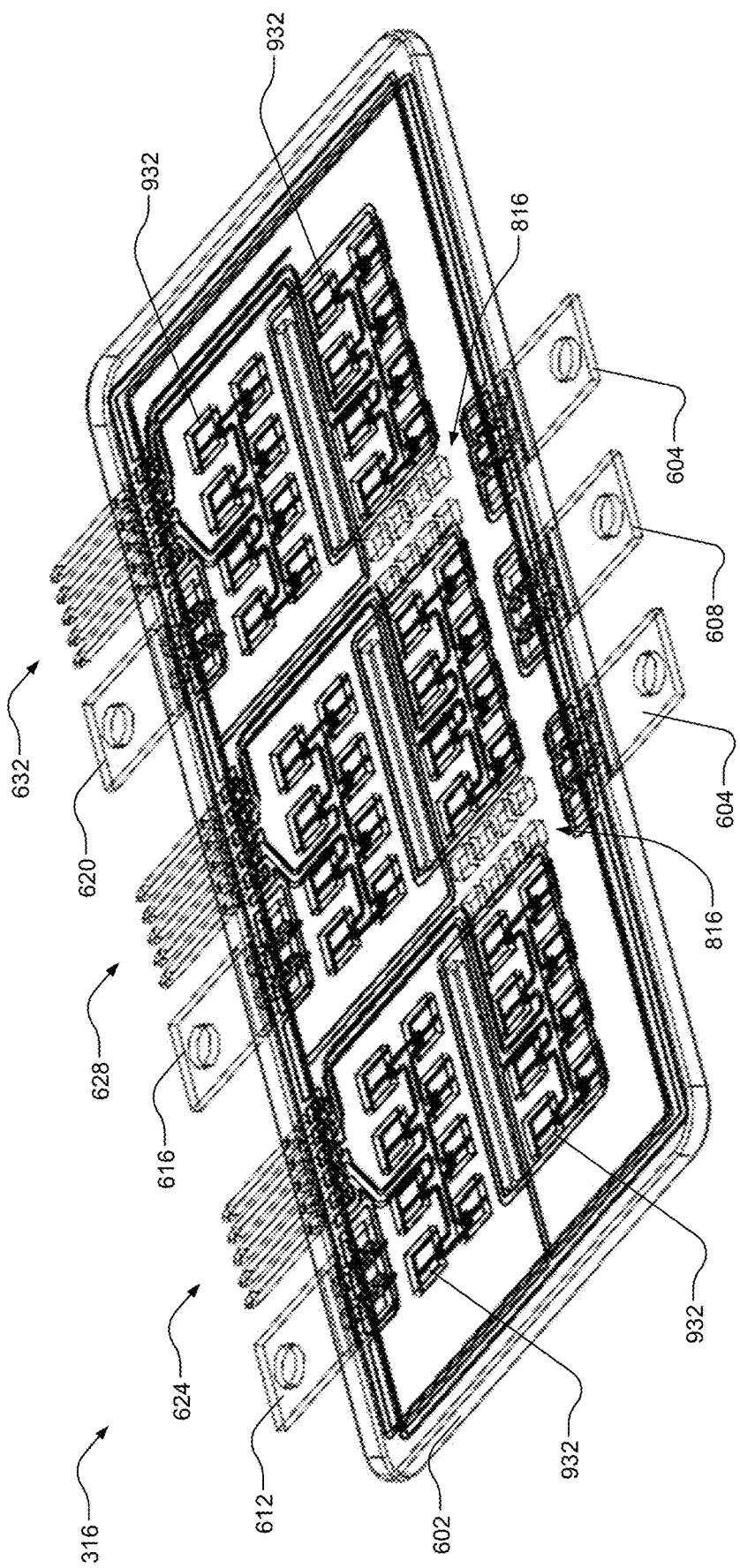
Figure 7:
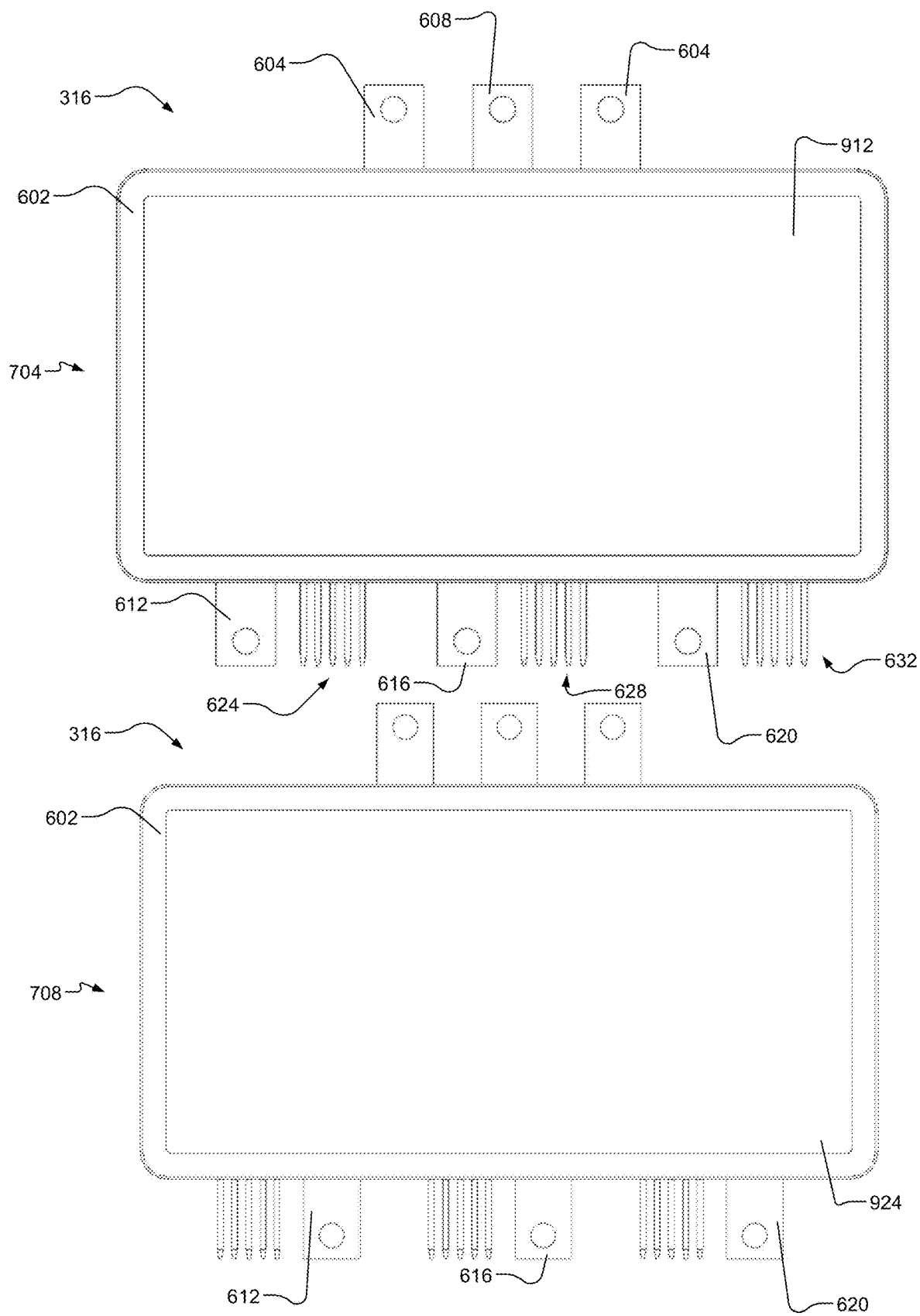
FIGS. 7 and 8 include top and bottom views of an example power module.
Figure 8:
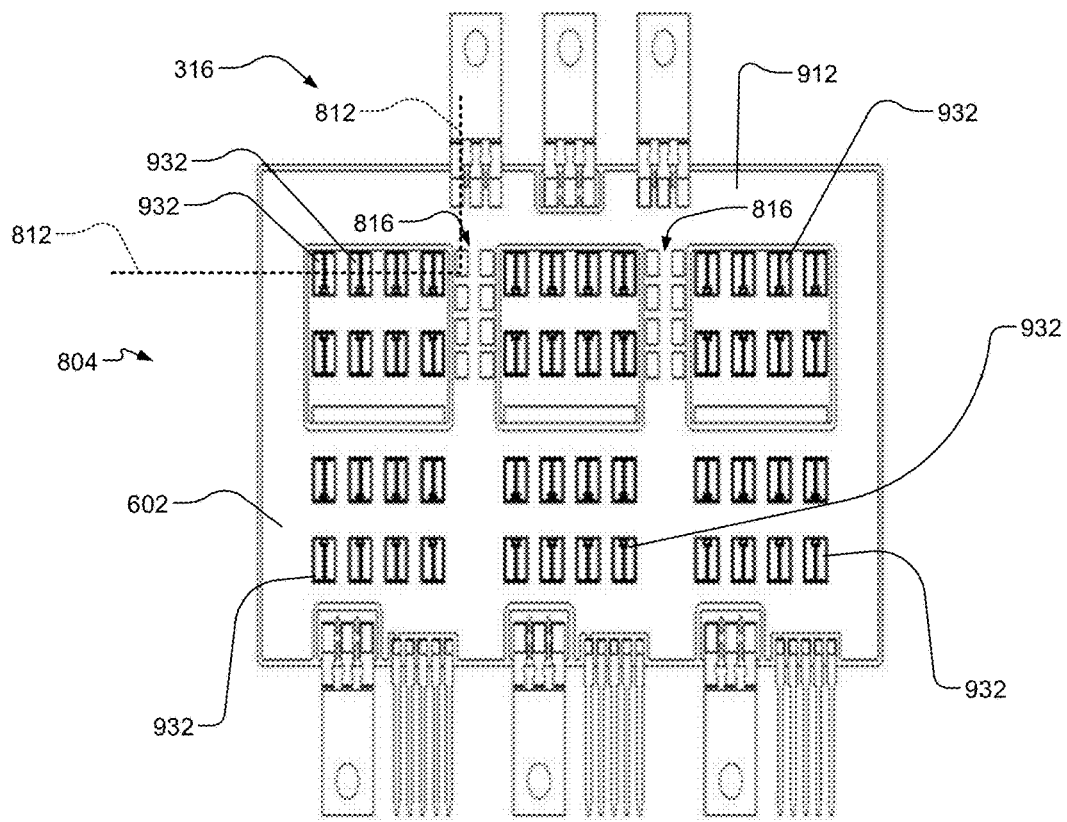
Figure 8:
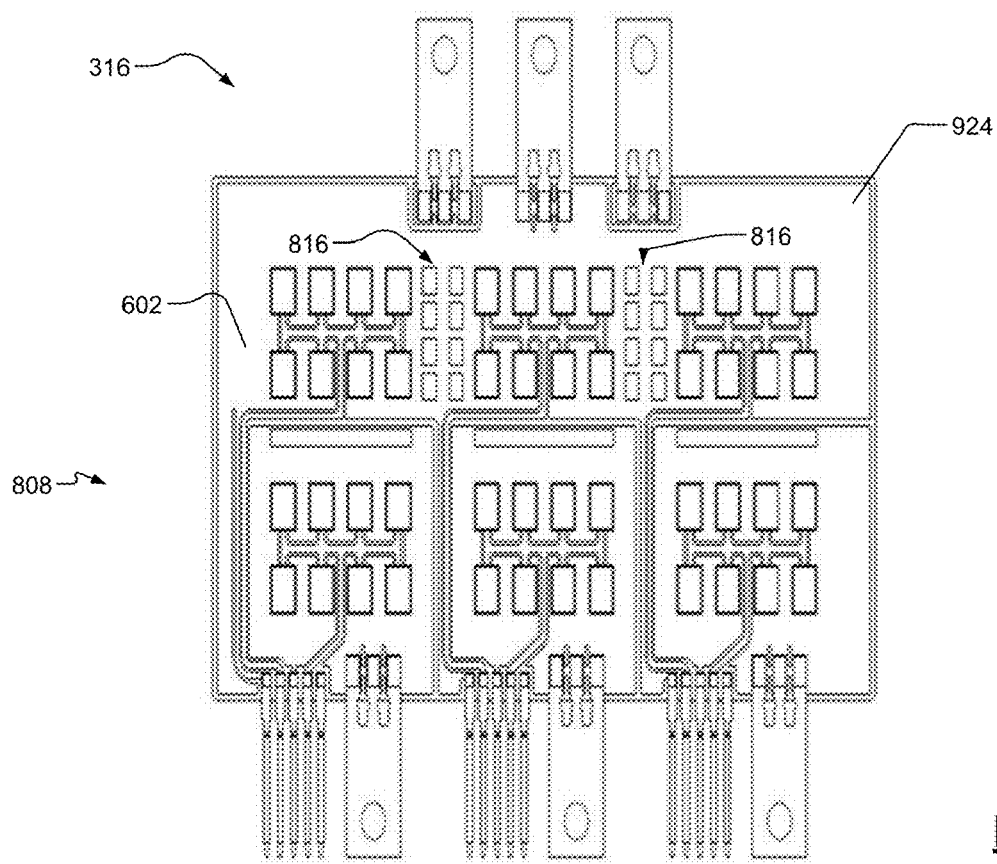
Figure 9:
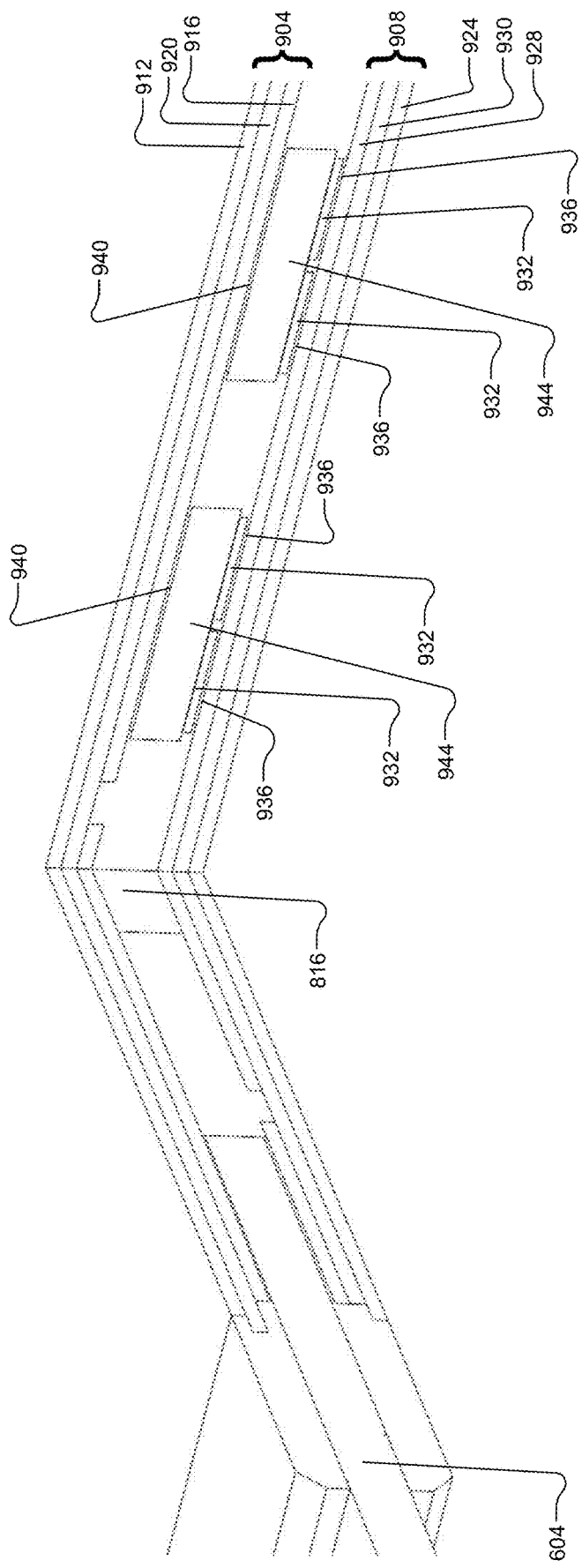
FIG. 9 includes a cross-sectional view of an example power module.

FIG. 5 is a perspective view of an example implementation of the inverter module 316 of FIG. 4A providing a three phase full bridge topology. FIG. 6 is another perspective view of the inverter module 316 as viewed through molding compound 602. FIG. 7 includes a top view 704 of the inverter module 316 and a bottom view 708 of the inverter module 316. FIG. 8 includes a top view 804 of the inverter module 316 as viewed through molding compound 602 and a bottom view 708 of the inverter module 316 as viewed through molding compound 602. FIG. 9 is a cross-sectional view of the inverter module 316 taken along lines 812 of FIG. 8.

Referring to FIGS. 6-9, the inverter module 316 includes DC conductors 604 and 608 that are configured to be connected to the battery 199. For example only, the (two) DC conductors 604 may be configured to be connected to a positive reference potential of the battery 199 (e.g., 304), and the DC conductor 608 may be configured to be connected to a negative reference potential of the battery 199 (e.g., 308). The inverter module 316 also includes AC conductors 612, 616, and 620 that are configured to be connected to the phases of the motor 198, such as 504, 542, and 570, respectively. The DC and AC conductors may include apertures through which electrically conductive wires can extend to connect to the battery 199 and the motor 198.

The inverter module 316 also includes pins 624, 628, and 632 that are connected to the source, gate, and drain terminals of the switches of the first, second, and third legs, respectively. The pins are connected to the terminals of the switches via internal conductive traces (between DBC layers), as discussed further below.

As illustrated in FIG. 9, the inverter module 316 includes a first direct bonded copper (DBC) substrate (layer) 904 and a second DBC substrate (layer) 908. The first and second DBC substrates 904 and 908 are planar. The first DBC substrate 904 includes a first planar copper layer 912, a second planar copper layer 916, and a ceramic layer 920 that is sandwiched between the first and second planer copper layers 912 and 916. The second DBC substrate 908 includes a first planar copper layer 924, a second planar copper layer 928, and a ceramic layer 930 that is sandwiched between the first and second planer copper layers 912 and 916. The first and second DBC substrates 904 and 908 are disposed within the molding compound 602. The ceramic layers 920 and 930 may be, for example, silicon nitride ($Si_3N_4$), aluminum nitride (AlN), or another suitable ceramic.

The inverter module 316 includes parallel dies for each switch of each of the legs/phases and parallel interconnects (e.g., 604, 608, 612, 616, 620, 624, 628, and 632). The conductors 604, 608, 612, 616, 620, 624, 628, and 632 extend outwardly from sides of the inverter module 316 on one or more planes that are parallel to the planes of the first and second DBC substrates 904 and 908. The planes of the first and second DBC substrates 904 and 908 are also parallel.

Also, gate and source connections of all of the dies are on the same DBC substrate while the drain connections of all of the dies are on the other DBC substrate. This allows for a large continuous area of copper for the drain connections and heat transfer from both sides of the inverter module 316. The capacitors are disposed between the connectors 604 and 608, such as illustrated by 816 in FIG. 8. The inverter module 316 including the capacitors 816 increases field cancellation for low inductance. The symmetrical spacing of the capacitors 816 relative to the connectors 604 and 608 provides symmetry and improves performance of the inverter module 316.

Figure 10:
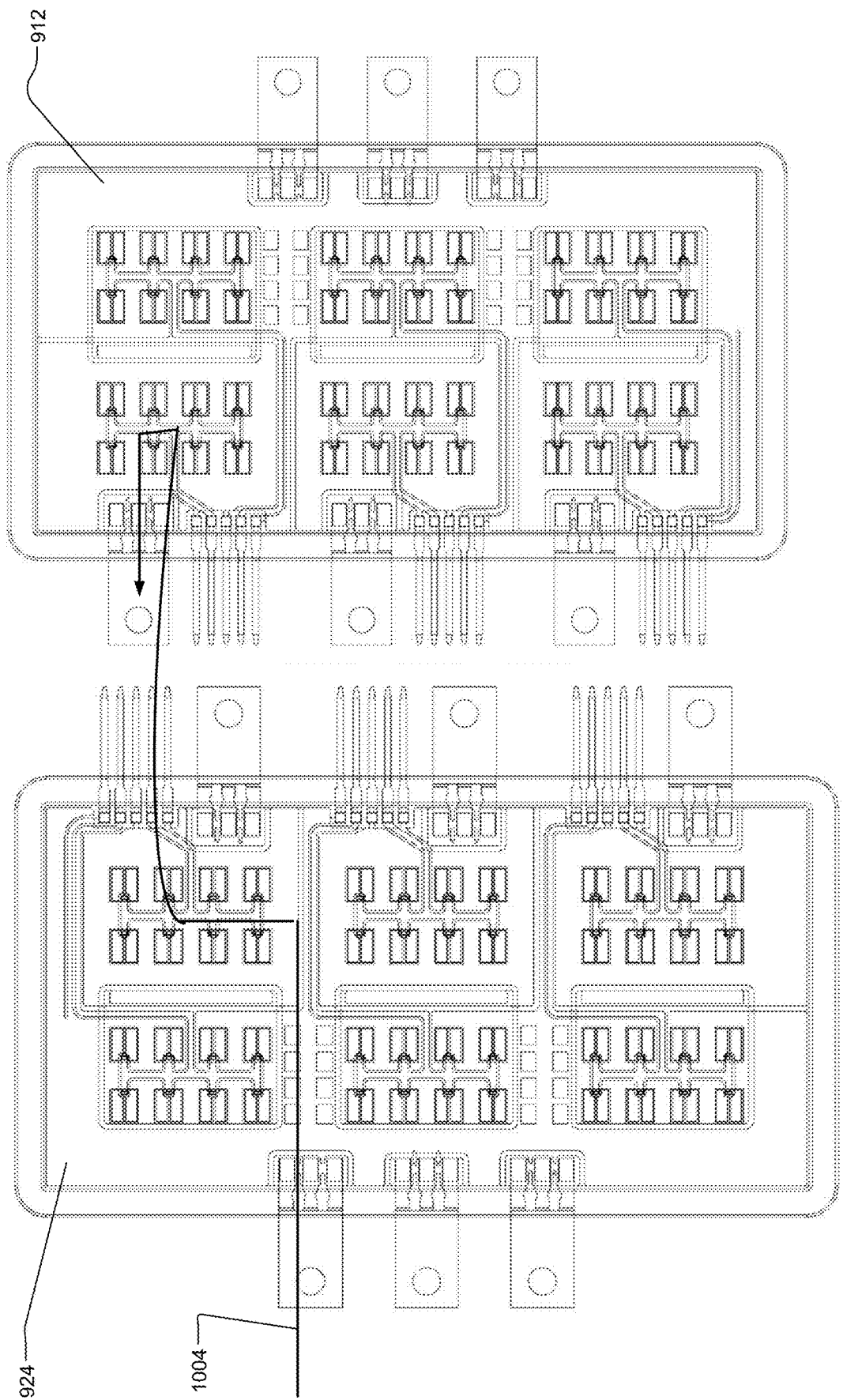
FIG. 10 includes a top and bottom views illustrating an example current path through a power module.

The switches of the legs are implemented in dies 932, such as including silicon and or silicon carbide (SiC). Die attach material 936 (e.g., silver or another suitable electrically conductive material) electrically connect the source and gate connections of the dies to the second DBC substrate 908. Die attach material 940 (e.g., silver or another suitable electrically conductive material) electrically connects the drain connections of the dies to the first DBC substrate 904. Spacers 944 are also disposed between the first and second DBC substrates 904 and 908. The spacers 944 may include, for example, copper (Cu) and/or molybdenum (Mo) as illustrated in FIGS. 6 and 8, the capacitors 816 are disposed between the dies of two switches of two different legs. FIG. 10 illustrates an example current path 1004 through the high side switch of one of the legs.

Figure 11:
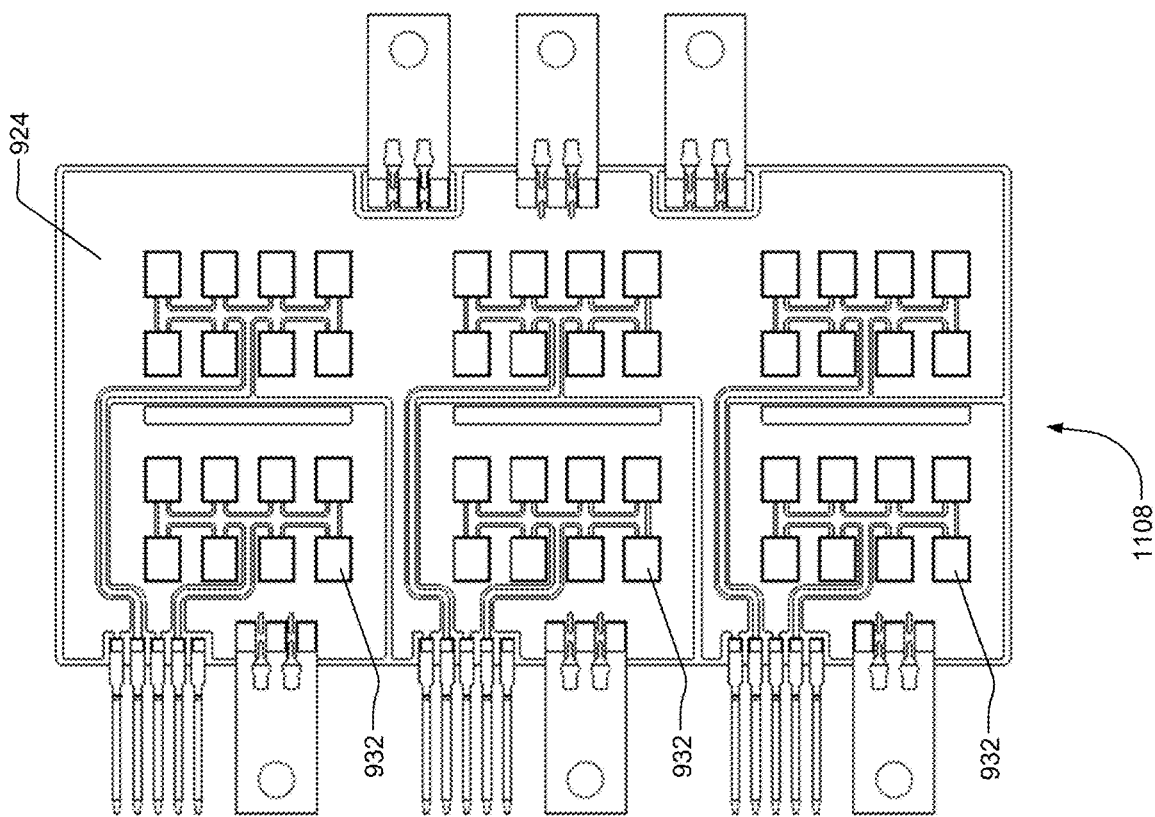
FIG. 11 includes top and bottom views of an example power module.
Figure 11:
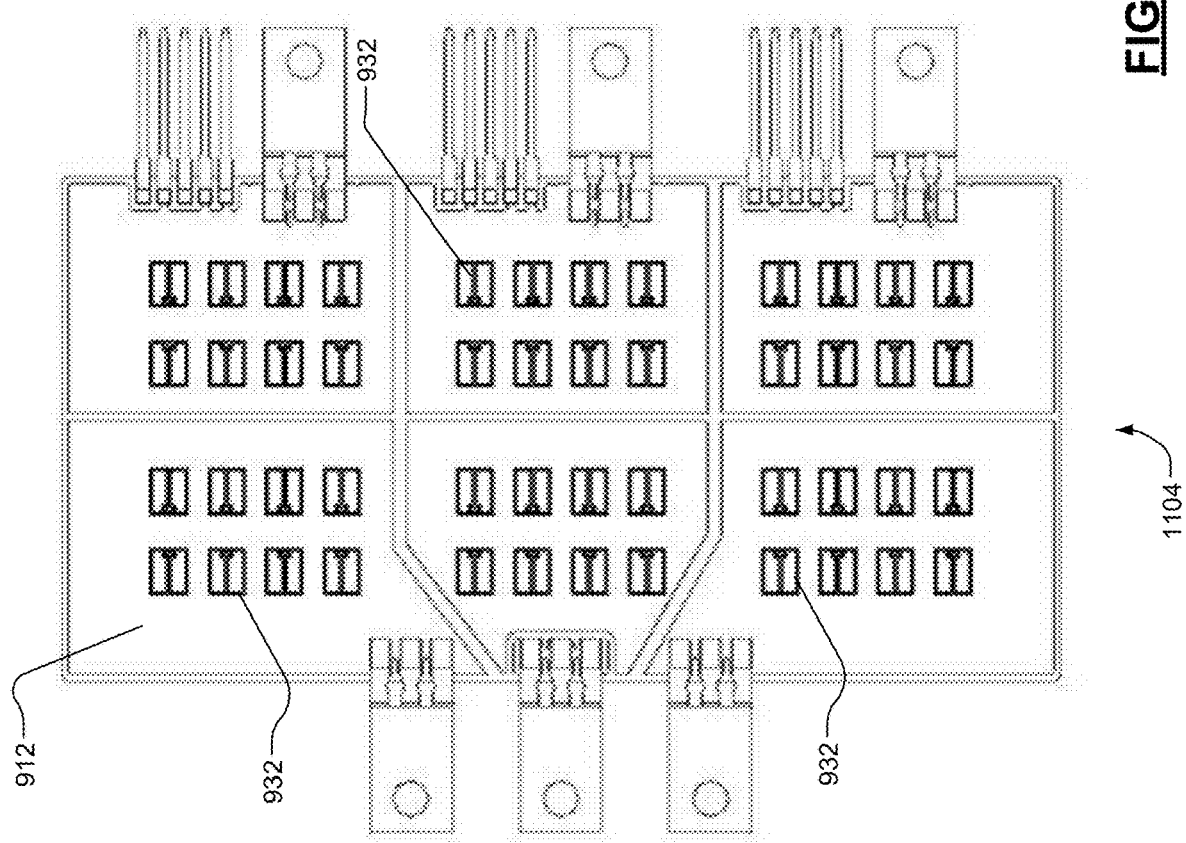

FIG. 11 includes perspective views of the power module of FIG. 4B. FIG. 11 includes a top view 1104 of the bidirectional switches as viewed through molding compound 602 and a bottom view 1104 of the bidirectional switches. The bidirectional switches are implemented as in FIG. 9, and have the same form factor as the inverter module 316 with three phase full bridge topography as discussed above.

The power modules discussed herein have batter thermal transfer than other types of power modules with similar power ratings due to having approximately 0.6× the thermal resistance of other types of power modules. The power modules discussed herein also have lower commutation loop parasitic inductance and lower commutation loop resistance than other types of power modules.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power module, comprising:
   a first substrate layer that is disposed on a first plane;
   a second substrate layer that is disposed on a second plane that is parallel to the first plane;
   first and second electrical conductors that are configured to be electrically connected to first and second direct current (DC) reference potentials, respectively, and that extend outwardly from the power module on a third plane that is parallel to the first and second planes;
   third, fourth, and fifth electrical conductors that are configured to be electrically connected to first, second, and third alternating current (AC) reference potentials, respectively, and that extend outwardly from the power module on a fourth plane that is parallel to the first, second, and third planes; and
   a plurality of dies of switches, respectively, disposed between the first and second substrate layers.

2. The power module of claim 1 wherein all source and gate terminals of the switches are disposed on the first plane and all drain terminals of the switches are disposed on the second plane.

3. The power module of claim 1 further comprising capacitors that are disposed between the first and second substrate layers and are electrically connected between the first and second electrical conductors.

4. The power module of claim 1 wherein the switches include silicon carbide switches.

5. The power module of claim 1 wherein the switches are connected in a bridge topography.

6. The power module of claim 1 wherein the switches include bi-directional switches.

7. The power module of claim 1 wherein the first substrate layer includes:
   a first copper layer;
   a second copper layer; and
   a first ceramic layer that is sandwiched between the first and second copper layers.

8. The power module of claim 7 wherein the second substrate layer includes:
   a third copper layer;
   a fourth copper layer; and
   a second ceramic layer that is sandwiched between the third and fourth copper layers.

9. The power module of claim 7 wherein the first ceramic layer includes silicon nitride.

10. The power module of claim 1 further comprising electrically conductive die attachment material disposed between source terminals of the switches and the first substrate layer, electrically conductive die attachment material disposed between gate terminals of the switches and the first substrate layer, and electrically conductive die attachment material disposed between drain terminals of the switches and the second substrate layer.

11. The power module of claim 1 wherein the electrically conductive die attachment material includes silver.

12. A motor system, comprising:
   the power module of claim 1;
   a battery; and
   an electric motor,
   wherein the first and second electrical conductors are configured to be electrically connected to the battery, and
   wherein the third, fourth, and fifth electrical conductors are configured to be electrically connected to first, second, and third connections of the electric motor.

13. A vehicle comprising:
   the motor system of claim 12,
   wherein the electric motor is configured to propel the vehicle.

14. The power module of claim 1 wherein portions of the first and second electrical conductors are disposed between the first and second substrate layers.

15. The power module of claim 14 wherein portions of third, fourth, and fifth electrical conductors are disposed between the first and second substrate layers.

16. The power module of claim 1 wherein:
the first and second electrical conductors extend outwardly from a first lateral side of the power module; and
the third, fourth, and fifth electrical conductors extend outwardly from a second lateral side of the power module, the second lateral side being opposite the first lateral side.

17. The power module of claim 1 further comprising pins that extend outwardly from the power module and that are electrically connected to gate, source, and drain terminals of the switches.

18. The power module of claim 17 further comprising electrically conductive traces between the first and second substrate layers that electrically connect the pins with the gate, source, and drain terminals of the switches.

19. The power module of claim 1 further comprising spacers disposed between the first and second substrate layers.

20. A power module, comprising:
a first substrate layer that is disposed on a first plane;
a second substrate layer that is disposed on a second plane that is parallel to the first plane;
first and second electrical conductors that are configured to be electrically connected to first and second direct current (DC) reference potentials, respectively, and that extend outwardly from the power module on a third plane that is parallel to the first and second planes;
third, fourth, and fifth electrical conductors that are configured to be electrically connected to first, second, and third alternating current (AC) reference potentials, respectively, and that extend outwardly from the power module on a fourth plane that is parallel to the first, second, and third planes; and
capacitors that are disposed between the first and second substrate layers and are electrically connected between the first and second electrical conductors.

\* \* \* \* \*